United States Patent [19]

Floy

[11] Patent Number: 4,647,252
[45] Date of Patent: Mar. 3, 1987

[54] UNDERGROUND PIPE AND TILE LAYING APPARATUS

[75] Inventor: Richard M. Floy, Thornton, Iowa

[73] Assignee: Melco Co., Inc., Mason City, Iowa

[21] Appl. No.: 697,900

[22] Filed: Feb. 4, 1985

[51] Int. Cl.$^4$ ................................................ F16L 1/02
[52] U.S. Cl. ........................................ 405/154; 405/174
[58] Field of Search ............... 405/154, 157, 158, 159, 405/174, 176, 179, 180, 181, 184; 37/98, 193; 172/239, 605, 677

[56] References Cited

U.S. PATENT DOCUMENTS

| | | | |
|---|---|---|---|
| 2,656,800 | 10/1953 | Reising | 405/157 |
| 2,738,745 | 1/1951 | Harpold | 111/5 |
| 2,830,548 | 4/1958 | McElvany | 111/5 |
| 2,916,835 | 12/1959 | Boyce | 37/98 |
| 3,081,827 | 3/1963 | Giles | 172/677 |
| 3,203,188 | 8/1965 | Evans | 405/179 |
| 3,292,379 | 12/1966 | McElvany | 61/72.5 |
| 3,309,799 | 11/1963 | Kincade | 37/80 |
| 3,528,255 | 9/1970 | Blinne | 37/98 X |
| 3,664,137 | 5/1972 | Lett | 405/179 X |
| 3,831,388 | 8/1974 | Wells | 405/179 X |
| 4,114,391 | 9/1978 | Kahley | 37/193 X |
| 4,197,033 | 4/1980 | Gendron | 405/170 |
| 4,343,573 | 8/1982 | Breitfuss | 405/155 |
| 4,576,514 | 3/1986 | Nielsen | 405/154 |

FOREIGN PATENT DOCUMENTS

| | | | |
|---|---|---|---|
| 2055440 | 3/1981 | United Kingdom | 405/179 |
| 2115261 | 9/1983 | United Kingdom | 405/181 |

Primary Examiner—Richard J. Scanlan, Jr.
Assistant Examiner—Nancy J. Stodola
Attorney, Agent, or Firm—Robert T. Johnson

[57] ABSTRACT

Laying of tile underground in a trench involves great care in maintaining a uniform grade and to lay the tile aligned uniformly. It is a purpose of this invention to disclose apparatus for laying of pipe and tile in an underground trench wherein a grade is maintained by means of a grade control shoe joined on the front end of a tile laying box and the tile laying box with the grade control shoe attached is pulled forward by the trench digging back hoe.

2 Claims, 11 Drawing Figures

SEC. B-B

UNDERGROUND PIPE AND TILE LAYING APPARATUS

BACKGROUND OF THE INVENTION

As the title indicates, this invention discloses Underground Pipe and Tile Laying Apparatus, and is directed to laying of pipe in a trench. The apparatus comprises a tile grade shoe, an unsealed tile laying box and grade control shoe pulled by a back hoe to established grade, and using a laser receiver to maintain the grade.

Certain terminology will be used in the following description for convenience in reference only, and will not be limiting. The words "tile" and "pipe" can be used interchangably, moving forward will designate direction in which the tile is being laid. Terminology is to include words specifically mentioned above, derivatives thereof, and words of similar import.

This invention comprises a grade control shoe, fitting into space provided in the leading or front bottom edge of a tile laying box. The tile grade shoe when pulled to the established grade, along with the tile laying box, gouges out the soil on a trench bottom to leave a soil bed of a suitable radius in which the pipe or tile is laid.

This soil bed is of such a radius or arc to allow the pipe or tile to be laid therein.

DISCLOSURE OF THE INVENTION

This invention discloses apparatus for laying of pipe or tile in a trench or ditch, and wherein the tile is laid to a predetermined grade, and in a soil bed prepared by a grade control shoe.

An object of this invention is to disclose apparatus for forming a bed or groove for laying of pipe or tile, said bed or groove is established to a predetermined grade and of a radius to accept the diameter of the tile being laid.

Another object of this invention is to disclose apparatus comprising a tile laying box, and a grade control shoe fitting in the front bottom of said box.

Another object of this invention is to disclose a method of forming a bed for laying of tile to a predetermined grade, in a trench, wherein the improvement comprises a tile laying box in said trench and a grade control shoe fitting in the front bottom of said box, and said box and shoe are moved forward in said ditch by suitable power means.

Another object of this invention is to disclose tile laying apparatus, wherein the improvement consists of a tile laying box and grade control shoe attached thereto, said grade control shoe consisting of a grade shoe, pull bars, and tow bar attached thereto.

Another object of this invention is to disclose tile laying apparatus comprising a tile laying box and a grade control shoe attached thereto, said grade control shoe attached to the front bottom of said tile laying box.

Another object of this invention is to disclose a tile laying apparatus comprising tile laying box, and a grade control shoe attached thereto, wherein the grade control shoe comprises flanges extending lengthwise of said grade control shoe and a facing of a flat plow section mounted at an angle, inclined upward on the face of said grade control shoe.

Another object of this invention is to disclose a tile laying box having slots in the bottom front edge to fit over pull bars of grade control shoe.

Another object of this invention is to disclose underground pipe and tile laying apparatus wherein a tile laying box is comprised of a front, back, and side sections and slots provided in the bottom front section of said tile laying box, and runner sections mounted lengthwise on bottom rear portions of side sections of said tile laying box.

Another object of this invention is to disclose underground pipe and tile laying apparatus wherein the improvement comprises a tile laying box and attachment of a grade control shoe to bottom of front section of said tile laying box and said attachment to allow pivoting upward and downward of said grade control shoe.

Another object of this invention is to disclose in underground pipe and tile laying apparatus wherein the means for attachment of a grade control shoe 12 to bottom of front section 15, of tile laying box 3, comprises eye bolts attached to flanges 18 of said grade control shoe and heads of said eye bolts fit between brackets 24, located on each side of slots 13, in the bottom of said front section 15, of tile laying box 3, and holes in said brackets aligned with eye bolt holes and bolts or pins inserted in said aligned holes thus connecting said grade control shoe 12 to tile laying box 3.

RELATED ART

The art related to this invention is disclosed in the following patents.

U.S. Pat. No. 2,830,548 to McElvany for Pipe Laying Method. This covers a method of laying drain pipe and comprises applying end pressure to the pipe as laid then covering said pipe while applying said pressure.

U.S. Pat. No. 3,292,379 to McElvany; Pipe Laying Apparatus. This covers a machine for maintaining a grade for laying pipe, wherein hydraulic cylinders are involved.

U.S. Pat. No. 4,197,033 to Gendron: Method of Installing A Pipeline. This is for laying pipe along a grade and discloses providing a temporary support for the pipe.

U.S. Pat. No. 4,343,573 to Breitfuss: Method And Apparatus For Making An Underground Pipeline. This discloses pipe laying apparatus comprising supports and apparatus for laying inner component sections of pipe, and apparatus to provide a grading member.

BRIEF DESCRIPTION OF THE DRAWINGS

FIG. 1 - Tile Laying Box Elevation; Side View wherein:
1 - Pull Bars
2 - Grade Shoe
3 - Tile Laying Box
4 - Laser Receiver
5 - Colored Lights
5a - Red
5b - White
5c - Green
6 - Tow Bar
7 - Rear of Unsealed Tile Laying Box
10 - Plow Section of Grade Control Shoe
11 - Trench
12 - Grade Control Shoe
14 - Pull Bar Attachment
15 - Front Wall of Tile Laying Box
20 - Trailing edge of Grade Control Shoe Plow Section
21 - Runner Section
22 - Leading Edge of Grade Control Shoe Plow Section FIG. 2 - Tile Laying Box; Plan View from the Top, wherein:
1 - Pull Bars
2 - Grade Control Shoe
3 - Tile Laying Box
4 - Laser Receiver
5 - Colored Lights -continued 6 - Tow Bar
7 - Rear of Unsealed Tile Laying Box
8 - Tile Laid in Ditch
10 - Plow Section of Grade Control Shoe
12 - Grade Control Shoe
14 - Pull Bar Attachment
15 - Front Wall of Tile Laying Box
20 - Trailing Edge of Grade Control Shoe Plow Section
21 - Runner Section
22 - Leading Edge of Grade Control Shoe Plow Section FIG. 3 - Tile Laying Box; Elevation View; Front of Box 1 - Pull Bars
2 - Grade Control Shoe
3 - Tile Laying Box
4 - Laser Receiver
5 - Colored Lights
5a - Red
5b - White
5c - Green
6 - Tow Bar
10 - Plow Section of Grade Control Shoe
13 - Slots at Bottom of Front Wall 15
15 - Front Wall of Tile Laying Box
20 - Trailing Edge of Grade Control Shoe Plow Section
22 - Leading Edge of Grade Control Shoe Plow Section FIG. 4 - Tile Laying Box; Elevation View; Rear of Box wherein:

Figure 5:
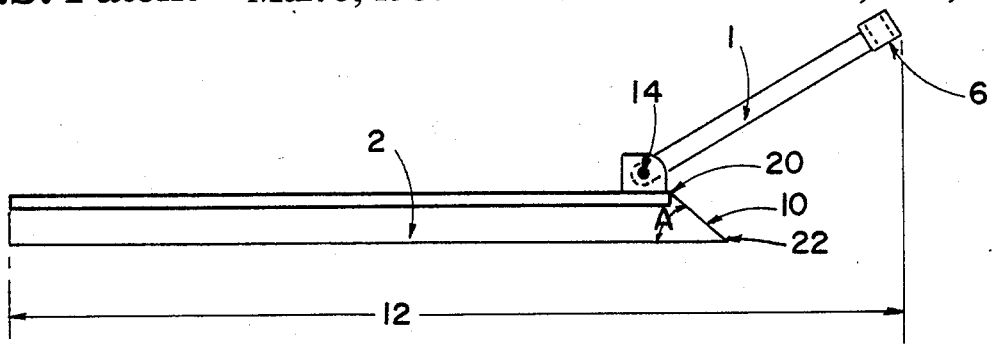

3 - Tile Laying Box
7 - Rear of Tile Laying Box
8 - Tile Laid in Ditch
9 - Cut out Section of Pipe Laying Box
19 - Trench bottom inside of Tile Laying Box
21 - Runner Sections FIG. 5 - Grade Control Shoe 12 wherein: (Side Elevation)

Figure 6:
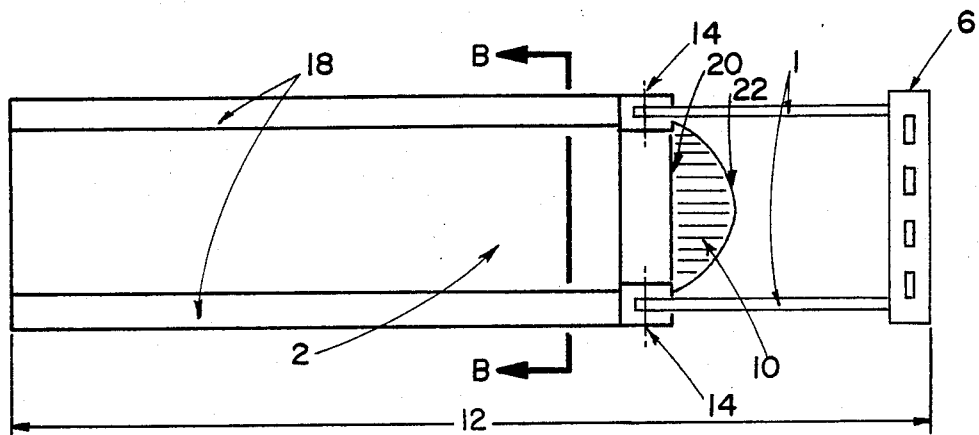

1 - Pull Bars
2 - Grade Shoe
6 - Tow Bar
10 - Plow Section of Grade Control Shoe
20 - Trailing Edge of Grade Control Shoe Plow Section
22 - Leading Edge of Grade Control Shoe Plow Section
A - Angle of Plow Section of Grade Control Shoe FIG. 6 - Grade Control Shoe 12 wherein: (Plan View)

Figure 7:
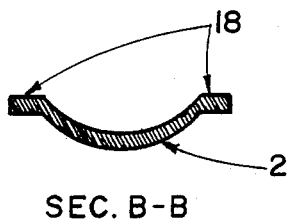

1 - Pull Bars
2 - Grade Shoe
6 - Tow Bar
10 - Plow Section of Grade Control Shoe
12 - Grade Control Shoe
18 - Flanges
20 - Trailing Edge of Grade Control Shoe Plow Section
22 - Leading Edge of Grade Control Shoe Plow Section FIG. 7 - Section of Grade Control Shoe 12, Rear View, wherein: (Elevation View)

2 - Grade Shoe
18 - Flanges

Figure 8:
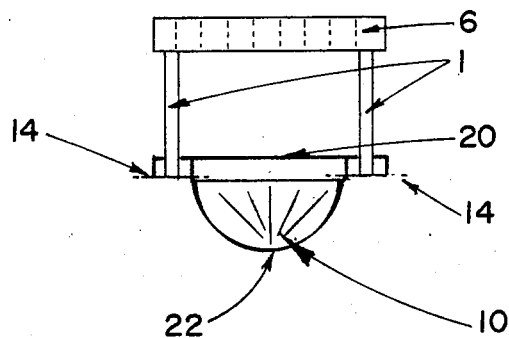

FIG. 8 - Section of Grade Control Shoe 12, Front View, wherein: (Elevation View)

Figure 9:
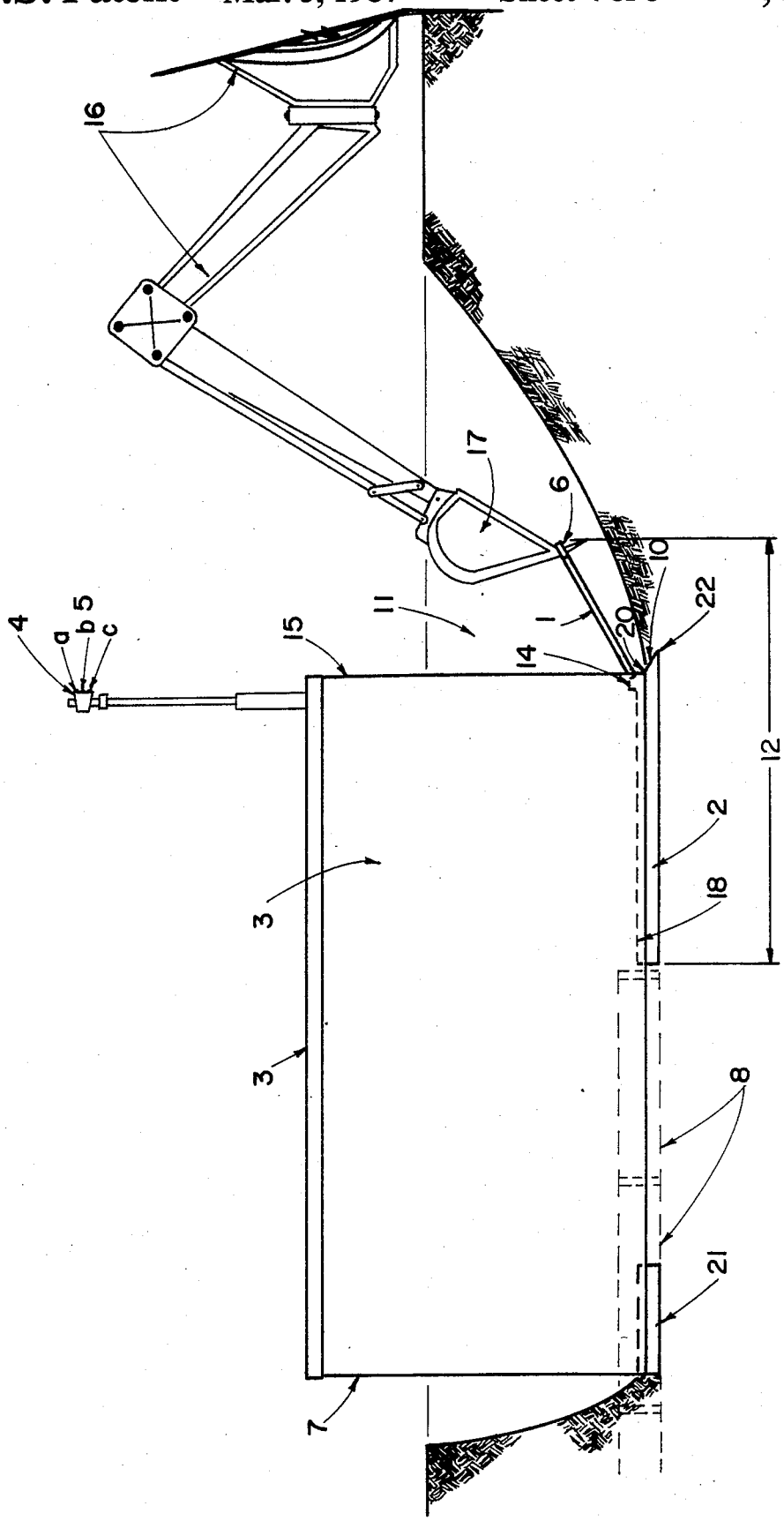
Figure 10:
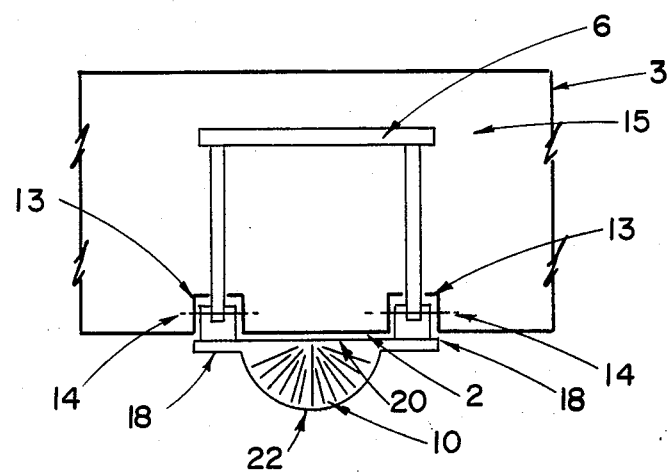
Figure 11:
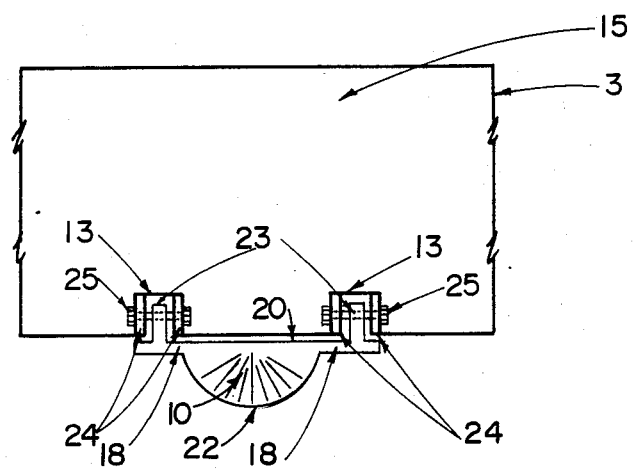

1 - Pull Bars
6 - Tow Bar
2 - Grade Shoe
10 - Plow Section of Grade Control Shoe
18 - Flanges
20 - Trailing Edge of Grade Control Shoe Plow Section
22 - Leading Edge of Grade Control Shoe Plow Section FIG. 9 - Elevation View of Complete Underground Pipe and Tile Laying Apparatus wherein:

1 - Pull Bars
2 - Grade Shoe
3 - Tile Laying Box
4 - Laser Receiver
5 - Colored Lights
5a - Red
5b - White
5c - Green
6 - Tow Bar
7 - Rear of Tile Laying Box
8 - Tile
10 - Plow Section of Grade Control Shoe
11 - Trench
12 - Grade Control Shoe
14 - Attachment of Pull Bars to Grade Shoe
15 - Front Wall of Tile Laying Box
16 - Back Hoe
17 - Back Hoe Bucket
19 - Trench Bottom Inside of Tile Laying Box
20 - Trailing Edge of Grade Control Shoe Plow Section
21 - Runner Section
22 - Leading Edge of Grade Control Shoe Plow Section FIG. 10 - Expanded Elevation View of Grade Control Shoe 12 Fitting on Tile Laying Box wherein:

1 - Pull Bars
2 - Grade Shoe
3 - Tile Laying Box
6 - Tow Bar
10 - Plow Section of Grade Control Shoe
13 - Slots at Bottom of Front Wall 15
18 - Flanges
20 - Trailing Edge of Grade Control Shoe Plow Section
22 - Leading Edge of Grade Control Shoe Plow Section FIG. 11 - Enlarged Plan View of Attaching Grade Control Shoe 12 to Tile Laying Box 3, at the bottom of 15 front wall of tile laying box 3, wherein:

3 - Tile laying box
13 - Slots at Bottom of Front Wall 15
15 - Front Wall of Tile Laying Box
18 - Flanges on Side of Grade Shoe
20 - Trailing edge of grade control shoe plow section
22 - Leading edge of grade control shoe plow section
23 - Eye bolts Attached to Flanges 18
24 - Brackets Attached to Bottom of Front Wall of Tile Laying Box
25 - Bolts Extending through Holes of Brackets 24, and Eye Bolts 23

SUMMARY OF THE INVENTION

This invention facilitates laying of pipe or tile in a trench while maintaining a specific grade and eliminates the need for experienced laborers in the pipe laying operation. The pipe or tile is laid in a preformed bed as described below.

In laying of pipe by this invention, the equipment comprises a backhoe in conjunction with a laser beam, a grade control indicator, a grade control shoe, and a laser receiver mounted in a box set at a height above grade level.

My invention, a grade control shoe, is fastened on the bottom front edge of a tile laying box. This grade control shoe is fastened by suitable means to allow a pivoting action thereon by the grade control shoe. This pivoting action to be only in an up-down direction, to adjust, by raising or lowering the leading cutting edge, to control the depth of tile laying groove cut into the trench bottom. This control of the depth of tile laying groove maintains the grade of the pipe being laid.

The grade control shoe has a radius such that the groove cut in the trench bottom, by said shoe, is of about the same radius as the outer dimension of tile, to lay in the groove.

The above stated groove is of such dimension to support the pipe for up to one-half of the circumference of the pipe being laid, to insure that the tile so laid will withstand the pressure in deep as well as shallow trench conditions.

The grade control shoe and tile laying box together protects the worker from earth cave-ins and insures the tile is laid to a grade and is bottomed in the groove cut in the trench bottom.

This grade control shoe does not have any hydraulic parts, is purely mechanical and is controlled by the back hoe using the power of said back hoe.

DESCRIPTION OF THE INVENTION

Figure 1:
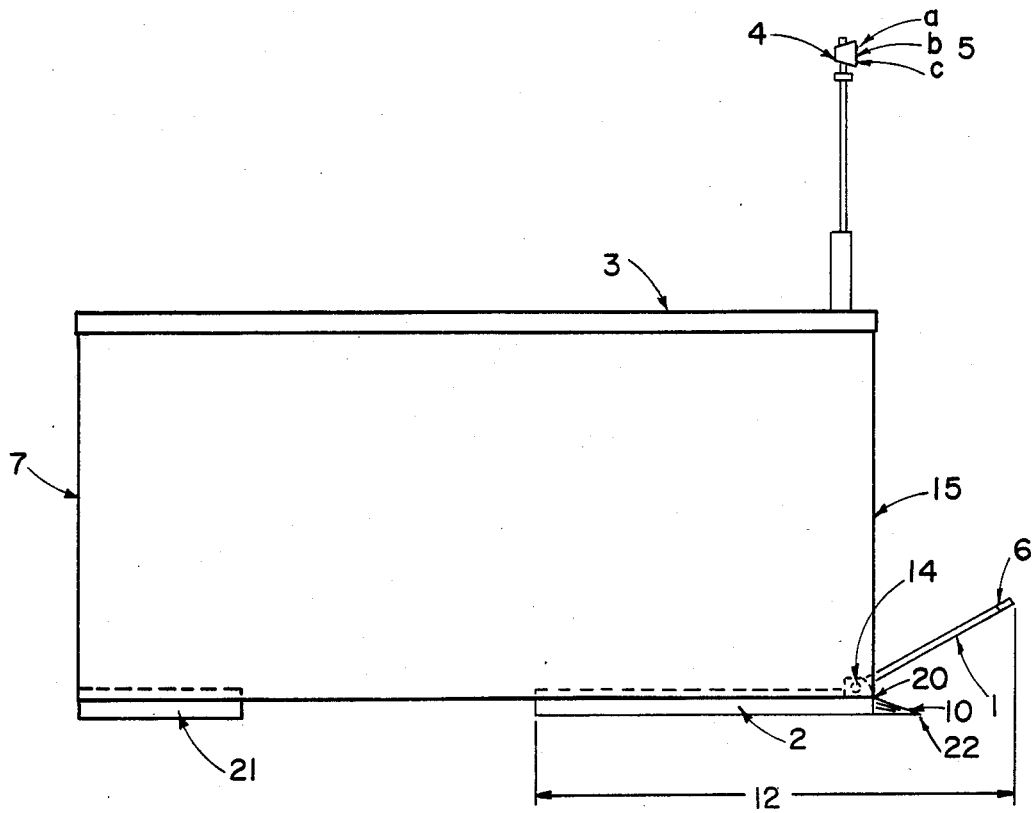
Figure 2:
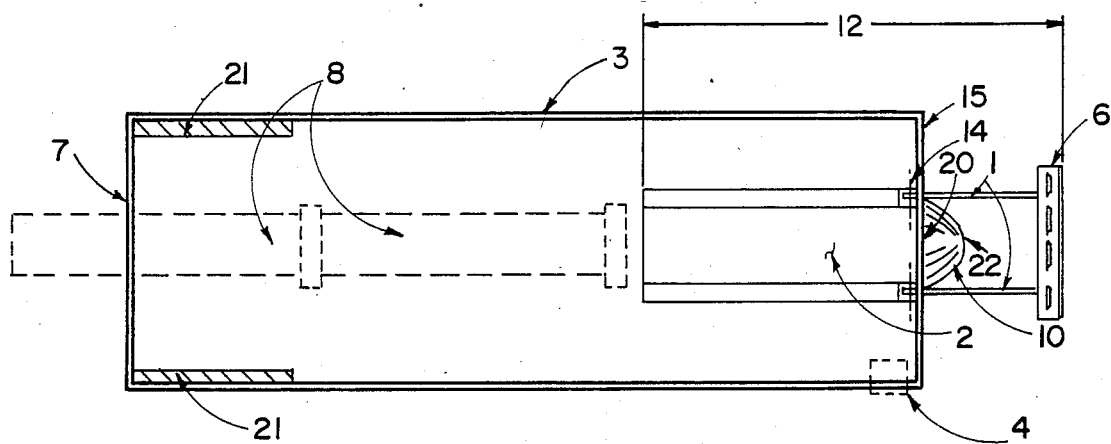
Figure 3:
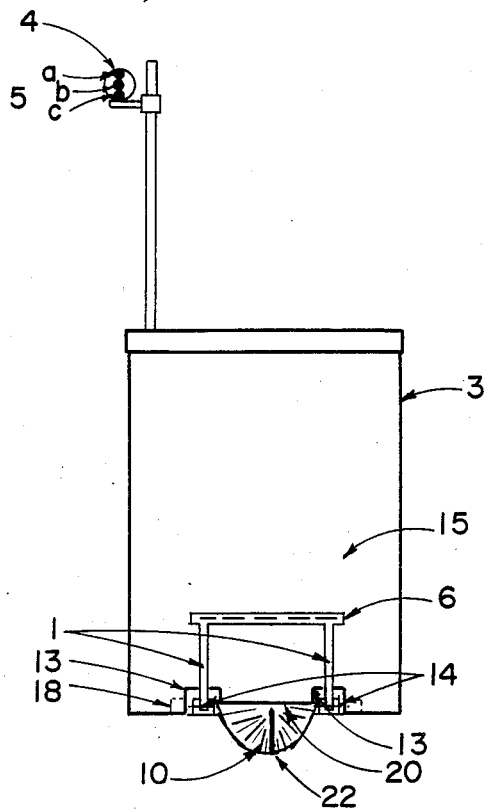
Figure 4:
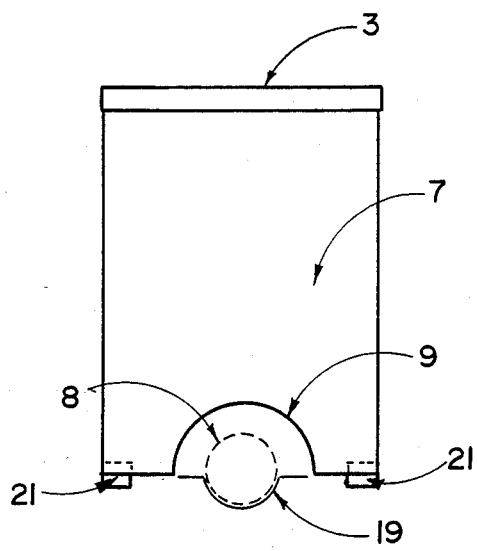

The tile laying box and grade control shoe, FIG. 1, is in place in the dug trench, and a back hoe acts to remove soil ahead of this tile laying box, to about 5% above grade. The bucket of the back hoe engages the tow bar attached to the grade control shoe. The grade control shoe and tile laying box is then pulled forward as a unit. The grade is maintained by responding to the three light laser receiver, wherein if the grade is going too shallow, the top light is turned on, the lighting of the center light indicates the grade is OK, while if the lower light is on, then adjustment should be made to raise the grade etc.

When the back hoe has pulled the grade control shoe 12 and tile laying box 3, the length of the excavation, the back hoe bucket is disengaged from the tow bar 6 and the next cycle of digging another section of trench is begun. In the meantime, as the digging is begun, the tile sections are laid in the groove made by the advancement of the grade control shoe 12 which shoe is the invention disclosed herein.

DETAILED DESCRIPTION OF THE INVENTION

The invention disclosed herein is for a grade control shoe 12 fitting in slots at the bottom of front wall 15 of tile laying box 3 which box serves to protect workmen working therein from trench cave-ins while assemblin tile.

This grade control shoe 12 has eye bolts 23, attached to flanges 18, which eye bolts fit into slots 13 in bottom of front wall 15 and align with brackets 24, to allow bolts 25 to fit therein to allow a pivot action up and down of said grade control shoe 12 mounted on the bottom front wall 15 of tile laying box 3. Tow bar 6 is fastened to pull bars 1 which bars 1 are in turn fastened to grade shoe 2.

Pull bars 1, are mounted in an upward direction and extend upward and outward at an angle of about 45° from the longitudinal axis of the grade control shoe 12.

The grade control shoe 12 as shown in FIG. 5, comprises pull bars 1, grade shoe 2, tow bar 6 and front plow section 10. This front plow section 10 is a solid face A slanted at angle of about 45°. The angle A of slant of this front plow section 10 can vary, depending on the type of soil being excavated, and said slant of the front plow section extends upward and backwards from the leading edge 22 to 20, trailing edge of grade control shoe plow section of the grade control shoe plow. Leading edge 22 of plow section 10 makes the initial contact with the trench bottom to cut the groove therein, in which the tile is laid.

The assembly of the grade control shoe 12 is positioned on the bottom of trench 11 and tile laying box 3 is mounted on said grade control shoe 12 as shown in FIGS. 1 and 9, and 11.

To lay tile 8 to a definite grade, laser receiver 4, containing lights 5, (5a, 5b and 5c), which may be colored if so desired, is mounted on upper edge of tile laying box 3, the laser receiver 4, on indicating that the grade is not correct, adjustment is then made by engaging the teeth of the back hoe bucket 17 to tow bar 6 of grade control shoe 12 to cause the grade control shoe 12 to either dig deeper or shallower to correct the grade, or to maintain the grade.

Tile is laid in the trench bottom of the tile laying box 3, and as this box is pulled forward, the laid tile fits in the groove, established in the trench bottom 19 by the action of moving grade control shoe 12, in a forward direction.

The tile laying box 3 has a suitable opening 9 in the bottom of the rear wall 7, of said box 3, so that as said tile laying box 3 is moved forward, the laid tile 8 is undisturbed.

It is to be pointed out that the tile laying box 3 can best be described as a box comprised only of four walls, without a cover or a bottom panel. Attaching the grade control shoe 12 to the 15 bottom front wall of tile laying box, can be done in many different ways, but a preferred method is an eye bolt fastened to each side of 2 control shoe at a location at 20 trailing edge of grade control shoe plow section, and said eye bolts to align with eyes mounted near the bottom 15 front wall of tile laying box, and a pin or bolt extending through the eye bolts and eyes to thus attach 12, grade control shoe to the bottom 15 front wall of tile laying box as shown in FIG. 11.

Such mounting to allow for up and down pivot movement of grade control shoe.

Slots 13 at the bottom of 15, front wall of tile laying box, are of such spacing to allow eye bolts 23, attached to grade control shoe 12 to fit therein. Eyes of bolts are aligned with bolt holes in 24 brackets attached to the bottom of wall 15, said brackets 24 are mounted on both sides of slots 13, and thus straddle the eyes of bolt above mentioned. Thus, when bolts 25 are inserted in the aligned holes of the eye bolts 23 and holes of brackets 24, the tile laying box 3 is then attached to the grade control shoe 12.

The tile box 3, when mounted as described above, the front wall 15 then rests near the upper surface of the grade control shoe and is thus elevated off of the bottom of the trench.

Runner sections 21, located on the bottom rear sidewalls of tile laying box 3 are so situated to allow the tile laying box 3 to be more readily moved forward in the trench, as these runner sections 21 act as sliding runners between the bottom of the trench and rear bottom of tile laying box 3.

Having described my invention, I claim:

1. Underground pipe and tile laying apparatus for laying a pipe or tile into the ground wherein the improvement comprises a tile laying box which includes a front wall, side walls and a rear wall and wherein the rear wall bottom includes an opening for the tile laid, and a grade control shoe consisting of a grade shoe, and flanges extending lengthwise of said grade shoe, pull bars attached to the forward end of said grade shoe and a tow bar attached to said pull bars, wherein the grade control shoe is attached to the front bottom of said tile laying box by means of eye bolts attached to said flanges to allow pivoting upward and downward of said grade control shoe and a facing being the leading edge of control shoe plow section, said facing being a flat plow section mounted at an angle inclined upward and backward on control shoe, and leading edge of said grade control shoe plow section having a radius such that a groove is cut in the trench bottom, and said groove in the trench bottom is the same radius as the outer dimension of the tile being laid and runner sections mounted lengthwise on bottom rear portions of side sections of said tile laying box.

2. Underground pipe and tile laying apparatus of claim 1 wherein the improvement consists of a grade control shoe having flanges extending lengthwise of said grade shoe, pull bars and tow bar attached to forward end of said grade shoe and a facing on said grade shoe, said facing consisting of a flat plow section mounted at an angle of 45°, inclined upward and backwards.

* * * * *